US007041935B2

(12) United States Patent
Raymond et al.

(10) Patent No.: US 7,041,935 B2
(45) Date of Patent: May 9, 2006

(54) APPARATUS AND METHODS FOR CONNECTING A PLASMA ARC TORCH LEAD TO A POWER SUPPLY

(75) Inventors: Terry N. Raymond, White River Junction, VT (US); Fred A. Rogers, Enfield Center, NH (US); Christopher J. Conway, Wilmot, NH (US); Kevin D. Horner-Richardson, Cornish, NH (US)

(73) Assignee: Thermal Dynamics Corporation, West Lebanon, NH (US)

( * ) Notice: Subject to any disclaimer, the term of this patent is extended or adjusted under 35 U.S.C. 154(b) by 193 days.

(21) Appl. No.: 10/292,249

(22) Filed: Nov. 12, 2002

(65) Prior Publication Data

US 2004/0089639 A1   May 13, 2004

(51) Int. Cl.
 *B23K 10/00* (2006.01)

(52) U.S. Cl. .................... 219/121.48; 219/121.39; 219/121.45; 219/121.54

(58) Field of Classification Search .......... 219/121.39, 219/121.48, 121.5, 121.51, 74, 75, 21.59, 219/121.36, 127, 137 R, 121.45
See application file for complete search history.

(56) References Cited

U.S. PATENT DOCUMENTS

| 3,148,261 | A | * | 9/1964 | Schlenz ...................... 200/545 |
| 4,400,611 | A | * | 8/1983 | Wilkinson ............... 219/137 R |
| 4,584,442 | A | * | 4/1986 | Shields et al. ......... 191/12.2 R |
| 4,731,518 | A | * | 3/1988 | Parmelee et al. ...... 219/137.31 |
| 5,874,709 | A | * | 2/1999 | New et al. ............... 219/137.9 |
| 2004/0089639 | A1 | * | 5/2004 | Raymond et al. ...... 219/121.48 |

* cited by examiner

*Primary Examiner*—Mark Paschall
(74) *Attorney, Agent, or Firm*—Harness, Dickey & Pierce, P.L.C.

(57) ABSTRACT

A torch lead extension is provided that comprises a conduit having a distal end and a proximal end. The torch lead extension further comprises a distal connector member disposed at the distal end of the conduit and a proximal connector member disposed at the proximal end of the conduit. The distal connector member is engageable with a torch lead connector member secured to a proximal end of a torch lead. The proximal connector member is engageable with a power supply connector member of a power supply. Generally, the distal connector member and the torch lead connector member comprise a distal quick disconnect, and the proximal connector member and the power supply connector member comprise a proximal quick disconnect. Accordingly, the torch lead extension may be quickly assembled between or disassembled from the torch lead and the power supply.

77 Claims, 12 Drawing Sheets

APPARATUS AND METHODS FOR CONNECTING A PLASMA ARC TORCH LEAD TO A POWER SUPPLY

FIELD OF THE INVENTION

The present invention relates generally to plasma arc torches and more particularly to devices and methods for connecting a plasma arc torch lead to a power supply.

BACKGROUND OF THE INVENTION

Plasma arc torches are commonly used for cutting, marking, gouging, and welding metal workpieces by directing a high energy plasma stream consisting of high temperature, high momentum ionized gas particles toward the workpiece. A typical plasma arc torch is commonly connected to a power supply through a torch lead, which generally provides a conduit for the delivery of both fluid (i.e., gas, liquid) and power and/or electrical control signals between the power supply and the plasma arc torch. The torch lead is often secured to the power supply using a quick disconnect such that the torch lead may be quickly and easily removed from the power supply. Additionally, the torch lead is also connected to a torch head of the plasma arc torch, wherein such a connection is typically fixed within a handle of the plasma arc torch and is not readily releasable.

Although torch leads are typically available in a variety of lengths according to requirements of a specific operation, a longer torch lead often causes more difficulty in operating the plasma arc torch. For example, a longer torch lead is heavier and more likely to become entangled with an object located between the power supply and the workpiece than a shorter lead. Additionally, longer torch leads are generally more expensive than shorter leads. Accordingly, the length of a torch lead is preferably kept to a minimum sufficient length.

Occasionally, a particular operation may require the torch to be operated at a considerable distance away from the power supply, a distance much greater than that for other operations. Although the operator may simply choose a torch lead that is long enough for all of the operations, the longer torch lead, as described earlier, will likely make the operation of the torch more difficult. Alternatively, the operator may instead purchase and maintain in inventory multiple torch lead and torch head assemblies, each of which is a different length. The operator may then switch between the torch lead and torch head assemblies as the need arises. However, the costs associated with purchasing and then maintaining multiple torch lead and torch head assemblies on-site are relatively high. Indeed, such costs are even higher if a separate power supply is required for each of the assemblies.

On other occasions, a particular operation may require the use of a plurality of plasma arc torches, each of which possesses one or more different characteristics such as operating amps, among others. For example, a first plasma arc torch may be required for a first operation such as gouging, and a second plasma arc torch may be required for another operation such as cutting. However, the torch leads connected to the first and second plasma arc torches may not both be adapted for connection to the same power supply. If so, the operator may choose to maintain two separate plasma arc torch systems on-site (i.e., the first plasma arc torch and first power supply, and the second plasma arc torch and second power supply) and switch between the two systems as the need arises. However, the costs associated with maintaining more than one complete plasma arc torch system on-site are relatively high. Alternatively, the operator may instead choose to replace an existing torch lead with a compatible torch lead. The operator may replace the torch lead in its entirety by removing a series of connections and fittings, such as electrical wires and compression fittings, and then reattaching a new torch lead through the same set of connections and fittings. With plasma arc torches of the known art, however, replacing the torch lead or the torch head is relatively time-consuming and rather cumbersome.

Additionally, in some applications it is necessary to splice signal wires into existing torch leads. An example is when a user has purchased a torch for use on a fully automated cutting system, wherein the torch and lead is provided with no trigger control on the torch since there is normally no desire to require a person in the loop to activate the trigger switch. Start and stop signals are provided to the plasma system via some external controller signaling the plasma system logic directly. If that user later tries to use this same torch and plasma cutting system on a less sophisticated motion control system (for instance one that only provides simple pattern cutting) the motion control system typically does not interact with the plasma cutting system. In such a situation, a person in the loop is required to provide a start/stop signal via a remote trigger switch that must be spliced into the torch lead. Once the remote trigger is installed it is then difficult to reinstall the torch on a fully automated cutting system, since there is now an open switch in the control loop.

SUMMARY OF THE INVENTION

Accordingly, a need remains in the art for a device and method that allows an operator to easily and quickly adjust the distance at which a torch may be operated from a power supply, yet which is relatively low cost. A further need exists for such a device and method that allows an operator to easily and quickly adapt a torch lead for use with a variety of power supplies having different connector configurations, yet which is also relatively low cost. Moreover, a need exists for a device and method that allows for the quick and efficient installation and removal of a remote signal port.

In one preferred form, the present invention provides a torch lead extension that is used to connect a torch lead to a power supply. The torch lead extension comprises a conduit having a distal end and a proximal end. The torch lead extension further comprises a distal connector member disposed at the distal end of the conduit and a proximal connector member disposed at the proximal end of the conduit. The distal connector member is engageable with a connector member disposed at a proximal end of a torch lead. The proximal connector member of the torch lead extension is engageable with a connector member of the power supply. Generally, the distal connector member and the torch lead connector member comprise a distal quick disconnect, and the proximal connector member and the power supply connector member comprise a proximal quick disconnect. Thus, the torch lead extension may be quickly assembled between the power supply and the torch lead to increase the distance that the plasma arc torch may be operated away from the power supply through the use of the quick disconnects. Conversely, the torch lead extension may also be quickly disassembled from the torch lead and the power supply.

In another form, the present invention provides a torch lead adapter that is used between a power supply and a torch extension and/or between a torch extension and a torch lead.

The torch lead adapter comprises a conduit having a distal end and a proximal end. The torch lead adapter further comprises a distal connector member disposed at the distal end of the conduit and a proximal connector member disposed at the proximal end of the conduit. The distal connector member is engageable with a connector member disposed at a proximal end of a torch lead. The proximal connector member of the torch lead adapter is engageable with a connector member of the power supply.

Generally, the distal connector member and the torch lead connector member comprise a distal quick disconnect, and the proximal connector member and the power supply connector member comprise a proximal quick disconnect. However, the torch lead connector member is not directly mateable with the power supply connector member such that without the torch lead adapter, the torch lead cannot be directly connected to the power supply. Accordingly, the torch lead adapter is quickly assembled between the power supply and the torch lead such that a single torch lead may be used with a variety of power supplies and vice-versa. In operation, therefore, fluid and current are delivered between the power supply, the torch lead adapter, and the torch lead.

Additionally, a torch lead adapter is provided that may be used to connect a torch lead to a torch lead extension, a torch lead extension to a power supply, and/or a torch lead to a power supply when the connector members are not directly mateable. Moreover, a plurality of torch lead adapters and torch lead extensions may be employed in a plasma arc torch system according to the connections required and additional operational considerations.

In another form, a lead insert is provided that comprises at least one conduit for conducting fluid and electrical power, wherein the conduit defines a proximal end and a distal end. Further, at least one distal connector member is disposed at the distal end of the conduit and is engageable with one plasma arc torch system component, and at least one proximal connector member is disposed at the proximal end of the conduit and is engageable with another plasma arc torch system component. The lead insert further comprises a signal port spliced to the lead insert, wherein a plurality of signals may be integrated into the plasma arc torch through the signal port.

The present invention also provides methods for connecting a plasma arc torch lead to and disconnecting a plasma arc torch lead from a power supply, wherein either the torch lead extension or the torch lead adapter as previously described is placed in or removed from engagement with the power supply and the torch lead. Thus, the torch lead extension is used to increase the distance at which a plasma arc torch may be operated away from a power supply. Alternatively, the torch lead adapter is used to adapt a torch lead for use with a variety of power supplies having different connector configurations and vice-versa. By allowing one torch extension to be easily interchanged with a variety of power supplies, a reduction of plasma arc torch inventories and the costs associated therewith is realized because a single torch lead extension with a single torch lead adapter can be used with a variety of power supplies and vice-versa.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will be more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses. As used herein, a plasma arc apparatus or torch, whether operated manually or automated, shall be construed by those skilled in the art to be an apparatus that generates or uses plasma for cutting, welding, spraying, gouging, or marking operations, among others. Accordingly, the specific reference to plasma arc cutting torches or plasma arc torches herein should not be construed as limiting the scope of the present invention. The present invention should also not be limited to components specific to a plasma arc torches, wherein other fluid and electric power conducting components may be employed such as fluid and current conducting components in a tungsten inert gas (TIG) torch, among others.

Additionally, the terms proximal or proximal direction should be construed as meaning towards or in the direction of the power supply, and the terms distal or distal direction should be construed as meaning towards or in the direction of a nozzle or tip of the plasma arc torch. Furthermore, the specific reference to providing gas to a plasma arc torch should not be construed as limiting the scope of the present invention, such that other fluids, e.g. liquids, may also be provided to the plasma arc torch in accordance with the teachings of the present invention. Moreover, electric power as used herein should be construed as comprising not only the main power or current for generation of a plasma arc, but also power for other electrical functions such as signal pins or a pilot return that control additional torch functions, among others used within plasma arc torches. Additionally, as used herein, the term "electrical power" shall be construed to include both cutting power and electrical control signals for operation of the plasma arc torch. Finally, the use of the terms first, second, and other numerical terms referring to structures should not be construed as limiting the scope of the present invention in that such terms are used for identification purposes and should not be construed as specifying a particular order or sequence unless clearly indicated by the context.

Figure 1:
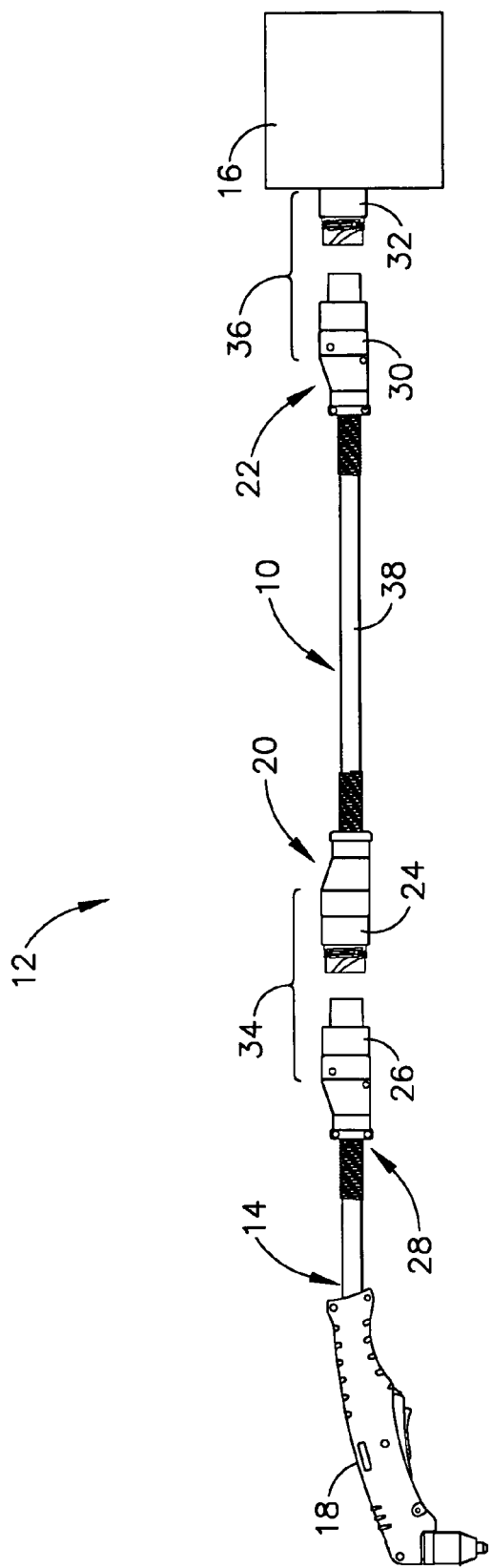
FIG. 1 is a side elevation view of a plasma arc torch including a torch lead extension constructed in accordance with the principles of the present invention.

Referring to the drawings, a plasma arc torch lead extension according to the present invention is generally indicated by reference numeral 10 in FIG. 1. The torch lead extension 10 is generally operable with a plasma arc torch 12, which comprises a torch lead 14, a power supply 16, and a torch 18. Generally, the torch lead extension 10 and the torch lead 14 together provide a means for delivering a supply of both fluid and power and/or electrical control signals between the power supply 16 and the torch 18.

As shown in FIG. 1, the torch lead extension 10 comprises a distal end 20 and a proximal end 22. A distal connector member 24 is disposed at the distal end 20 of the torch lead extension 10. The distal connector member 24 is engageable or mateable with a torch lead connector member 26 disposed at a proximal end 28 of the torch lead 14. As used herein, being "engageable," "engaged," or "mateable" shall be construed to comprise being connected to an adjacent plasma arc torch system component (i.e., power supply, torch lead, electrical controls, fluid controls, or pressure controls, among others) using a variety of connection means such as a quick disconnect, a fitting, or hard-wire splicing, which are described in detail below, among other connections known in the art.

The torch lead extension 10 further comprises a proximal connector member 30. The proximal connector member is disposed at the proximal end 22 of the torch lead extension 10. The proximal connector member 30 is engageable or mateable with a power supply connector member 32 secured to the power supply 16. Although the torch lead extension 10 is shown connecting the torch lead 14 to the power supply 16, the torch lead extension 10 may also be used to connect other plasma arc torch system components such as electrical controls, fluid controls, and pressure controls, among others. Connection of the torch lead extension 10 to other plasma arc torch system components besides the torch lead 14 and the power supply 16 as shown is described in greater detail below. By way of example only, the proximal connector member 30 may be engageable with a connector member secured to a Powermax® power supply from Hypertherm®, Inc., Hanover, N.H.

Figure 2:
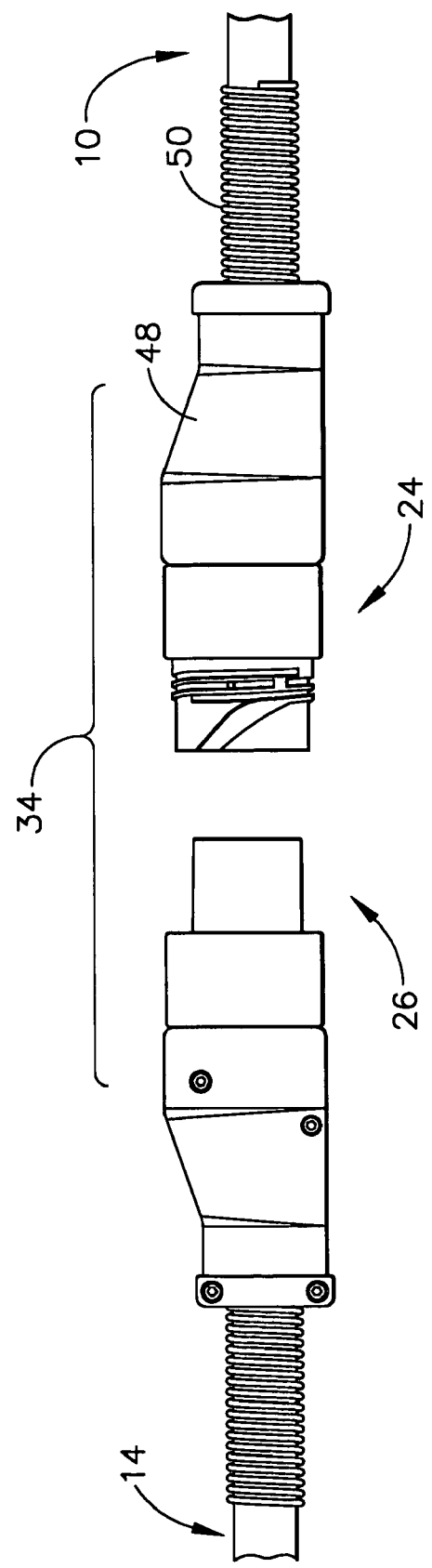
FIG. 2 is an enlarged side elevation view of a distal connector member of a torch lead extension and a torch lead connector aligned for engagement with one another in accordance with the principles of the present invention.

The distal connector member 24 and the torch lead connector member 26 are shown in greater detail in FIG. 2. Together, the distal connector member 24 and the torch lead connector member 26 comprise a distal quick disconnect 34, which allows the torch lead extension 10 and torch lead 14 to be quickly engaged with and disengaged from one another. Similarly, the proximal connector member 30 and the power supply connector member 32 together comprise a quick disconnect 36, which is shown in detail in FIG. 3. The quick disconnect 36 allows the torch lead extension 10 to be quickly engaged with and disengaged from the power supply 16. Preferably, the quick disconnects 34 and 36 comprise the quick disconnect configuration as shown and described in copending application titled "Plasma Arc Torch Quick Disconnect", U.S. patent application Ser. No. 10/052,364, filed Nov. 9, 2001, which is commonly assigned with the present application, and the contents of which are incorporated herein by reference.

Figure 4:
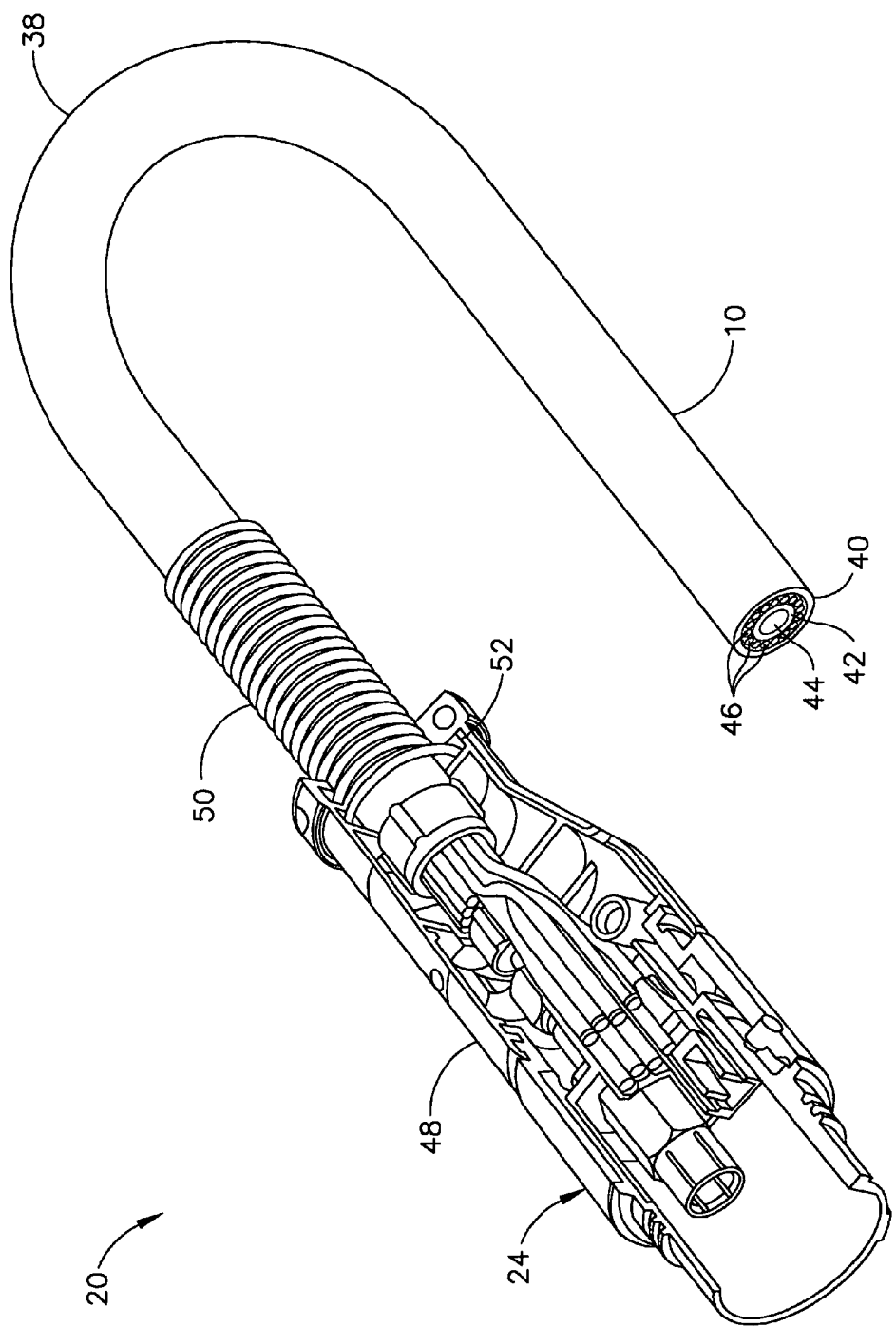
FIG. 4 is a perspective cut-away view of a distal end of a torch lead extension in accordance with the principles of the present invention.

Referring now to FIG. 4, the torch lead extension 10 further comprises a conduit 38 that has an outer resilient housing or sheath 40, an inner casing or sheath 42, and a fluid passage 44 therethrough. (The proximal connector member 30 is not shown for clarity). The fluid passage 44 provides a passage for a fluid flow through the torch lead extension 10 and is sized according to specific fluid flow requirements. The torch lead extension 10 may further include one or more electrical conductors 46, such as signal and main power wires, among others, which are used to conduct power and/or electrical control signals between the power supply 16 (not shown in FIG. 4) and the torch lead extension 10 for operation of the torch 18 (also not shown in FIG. 4). The electrical conductors 46 are housed within the outer sheath 40 of the conduit 38 such that the outer sheath 40 encases and protects the electrical conductors 46 from the surrounding environment. Preferably, the electrical conductors 46 are positioned between the outer and inner sheaths 40 and 42 circumferentially around the fluid passage 44, as shown. However, one or more of the electrical conductors 46 could alternately be positioned within the fluid passage 44 while remaining within the scope of the present invention. Additionally, although only one conduit 38 is shown, a plurality of conduits may also be employed for the purpose of delivering different types of fluids (e.g., argon, nitrogen, air, among others) for operation of the plasma arc torch 12 while remaining within the scope of the present invention. Accordingly, illustration of a single conduit 38 should not be construed as limiting the scope of the present invention.

In the illustrated embodiment, the length of the torch lead extension 10 is fixed, and when a different length is required for a certain operation, a different torch lead extension 10 having a longer or shorter length is connected between the torch lead 14 and the power supply 16. Accordingly, different length torch lead extensions 10 may be used or employed depending on the requirements of a specific operation. That is, the torch lead extension 10 may comprise any suitable length without departing from the spirit and scope of the present invention.

As shown in FIGS. 2 and 4, the distal connector member 24 comprises a socket 48 secured to the conduit 38. Preferably, a wire 50 wrapped around the outer sheath 40 provides a strain relief for the conduit 38 and is a metal material in one form of the present invention. Additionally, the socket 48 may be secured to the conduit 38 by way of hose barbs, an interference fit, adhesives, threaded members, or ribs, among others. Alternately, the socket 48 may be secured and/or further secured to the conduit 38 in a manner described in copending application titled "Modular Plasma Arc Torch", U.S. patent application Ser. No. 10/083,194, filed Feb. 26, 2002, which is commonly assigned with the present application, and the contents of which are incorporated herein by reference.

As shown, the distal connector member 24 may comprise a socket of the distal quick disconnect 34, and the torch lead connector member 26 may comprise a plug of the distal quick disconnect 34. Alternatively, the distal connector member 24 may comprise the plug of the distal quick disconnect 34, and the torch lead connector member 26 may comprise the socket of the distal quick disconnect 34 while remaining within the scope of the present invention.

Figure 3:
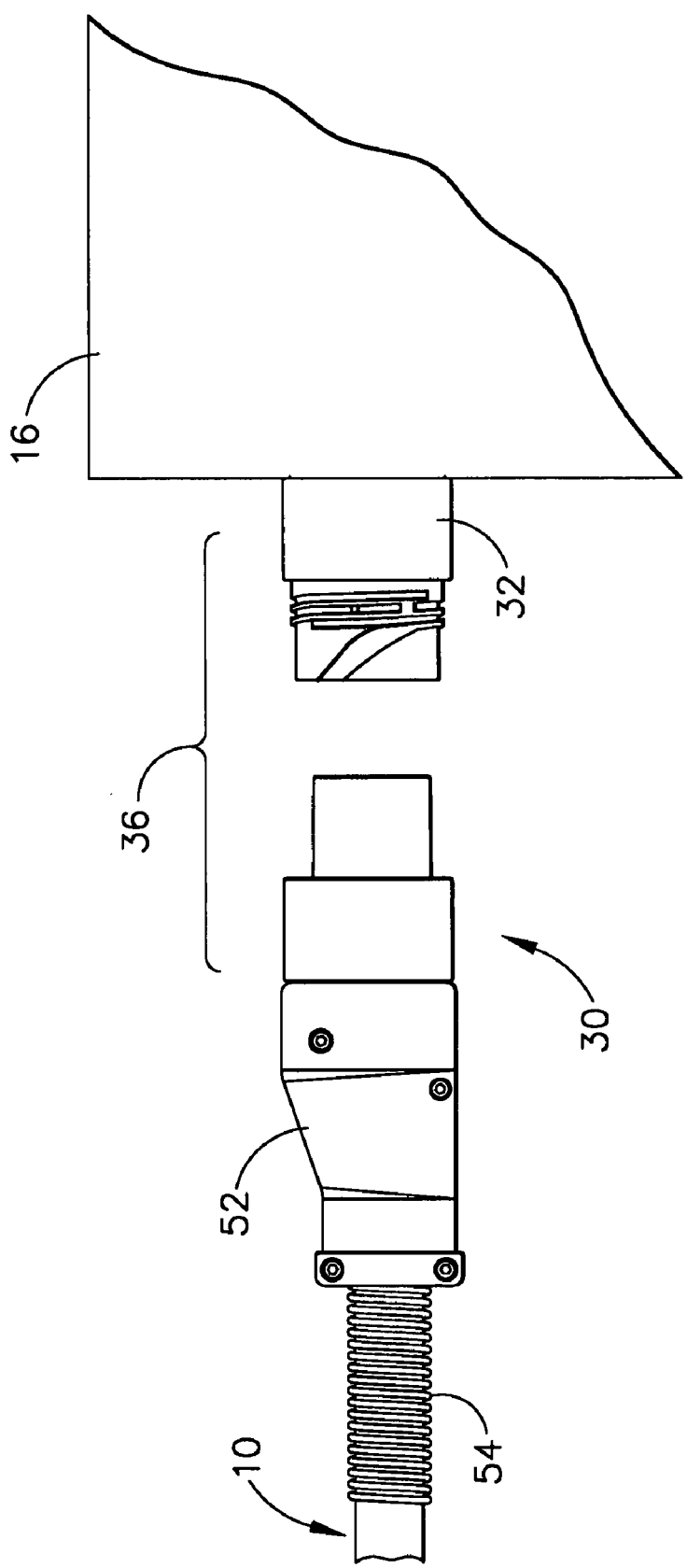
FIG. 3 is an enlarged side elevation view of a proximal connector member of a torch lead extension and a power supply connector member aligned for engagement with one another in accordance with the principles of the present invention.

As shown in FIG. 3, the proximal connector member 30 comprises a plug 52 secured to the conduit 38. Preferably, a wire 54 wrapped around the outer sheath 40 provides a strain relief for the conduit 38 and is a metal material in one form of the present invention. Additionally, a wide range of fastening systems and methods may be used to secure the plug 52 to the conduit 38. For example, the plug 52 may be secured and/or further secured to the conduit 38 by way of hose barbs, an interference fit, adhesives, threaded members, or ribs, among others. Alternately, the plug 52 may be secured and/or further secured to the conduit 38 in a manner described in copending application titled "Modular Plasma Arc Torch", U.S. patent application Ser. No. 10/083,194, filed Feb. 26, 2002, which is commonly assigned with the present application, and the contents of which are incorporated herein by reference.

As with the distal quick disconnect 34, the proximal quick disconnect 36 may comprise any of a wide range of suitable quick disconnects that are capable of conducting both fluid and power and/or electrical control signals. However, it should be noted that the distal and proximal quick disconnects need not be of the same quick disconnect configuration. Indeed, the distal and proximal quick disconnects are different from one another in another form of the present invention comprising a torch lead adapter, which is described in greater detail below.

As shown, the proximal connector member 30 may comprise a plug 52 of the proximal quick disconnect 36, and the power supply connector member 32 may comprise a socket 48 of the proximal quick disconnect 36. Alternatively, the proximal connector member 30 may comprise the socket 48 of the proximal quick disconnect 36, and the power supply connector member 32 may comprise the plug 52 of the proximal quick disconnect 36.

Figure 5:
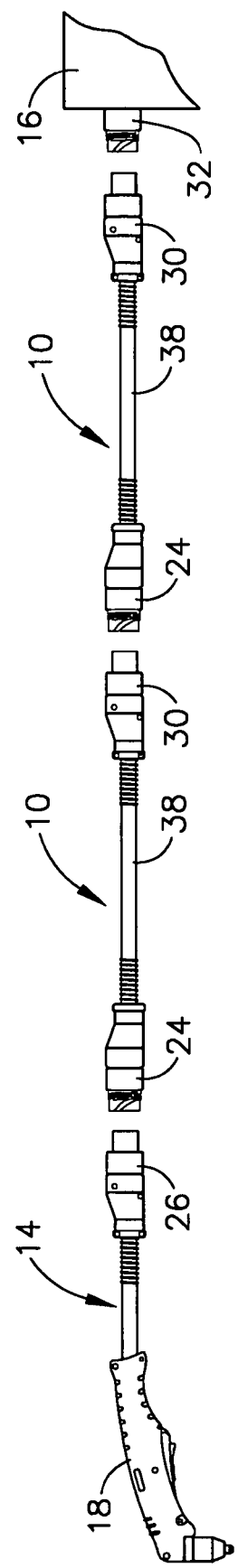
FIG. 5 is a side elevation view of a plasma arc torch including two torch lead extensions in accordance with the principles of the present invention.

Although FIG. 1 shows a single torch lead extension 10 between the torch lead 14 and the power supply 16, such need not be the case. That is, more than one torch lead extension 10 may be used in conjunction with the torch lead 14 to conduct fluid and power and/or electrical control signals between the power supply 16 and the torch 18. Indeed, if a considerable distance increase is needed, several torch lead extensions 10 may be used. In an exemplary embodiment shown in FIG. 5, two torch lead extensions 10 are used between the torch lead 14 and the power supply 16.

Moreover, the operational or functional length of a single torch lead extension 10 may be variable or adjustable. In an exemplary embodiment shown in FIG. 6, the torch lead extension 10 is sufficiently flexible to be at least partially wrapped or wound around a spool-like member 56, such as a spool or reel, among others. Preferably, the spool-like member 56 is a cylindrical shape that defines a curved surface 58. The curved surface 58 is sized to receive at least a portion of the torch lead extension 10 or to allow at least a portion of the torch lead extension 10 to be wrapped at least partially around the curved surface 58. Preferably, the curved surface 58 has a radius of curvature that is greater than the minimum bend radius of the torch lead extension 10 to ensure that the torch lead extension 10 will not be damaged or otherwise degraded when wrapped around the curved surface 58 of the spool-like member 56.

As a result, the distance between the distal and proximal connector members 24 and 30 of the torch lead extension 10 may be either increased by unwrapping at least a portion of the torch lead extension 10 from the curved surface 58 of the spool-like member 56, or decreased by wrapping at least a portion of the torch lead extension 10 at least partially around the curved surface 58 of the spool-like member 56. If the operation required, the torch lead extension 10 may be completely unrolled from the curved surface 58 of the spool-like member 56.

The process of wrapping the torch lead extension 10 around the curved surface 58 of the spool-like member 56 may be manual, automated, or a combination thereof. Likewise, the process of unwrapping the torch lead extension 10 from the curved surface 58 of the spool-like member 56 may also be either manual, automated, or a combination thereof. However, because devices for spooling and retracting are well-known in the art, the spool-like member 56 and the processes for spooling the torch lead extension 10 around the curved surface 58 and for retracting the torch lead extension 10 from the curved surface 58 are not described in further detail herein. In any event, by allowing the distance between the distal and proximal connector members 24 and 30 to be adjusted, the present invention allows for improved handling of longer torch lead extensions.

In another form, the length of the torch lead 14 may also be variable or adjustable with the spool-like member 56 as shown and described in relation to the torch lead extension 10. Accordingly, the spool-like member 56 is disposed along the length of the torch lead 14 between the torch 18 and the proximal end of the torch lead 14. Similarly, the curved surface 58 is sized to receive at least a portion of the torch lead 14 or to allow at least a portion of the torch lead 14 to be wrapped at least partially around the curved surface 58.

In another form, the present invention provides a method for connecting the torch lead 14 to the power supply 16. More specifically, the method comprises the steps of: disengaging the torch lead connector member 26 from the power supply connector member 32; engaging the distal connector member 24 with the torch lead connector member 26; and engaging the proximal connector member 30 with the power supply corresponding connector member 32. Accordingly, the torch lead extension 10 is quickly assembled between the torch lead 14 and the power supply 16, thereby allowing the torch 18 to be operated at a greater distance away from the power supply 16 than that which was otherwise possible when the torch 18 was connected to the power supply 16 with only the torch lead 14.

The method for connecting the torch lead 14 to the power supply 16 may further comprise the step of wrapping at least a portion of the torch lead extension 10 at least partially around the curved surface 58 defined by the spool-like member 56, thereby decreasing the distance between the distal and proximal connector members 24 and 30 of the torch lead extension 10. Alternatively, the method may further comprise the step of unwrapping at least a portion of the torch lead extension 10 from the curved surface 58 defined by the spool-like member 56, thereby increasing the distance between the distal and proximal connector members 24 and 30 of the torch lead extension.

Figure 7:
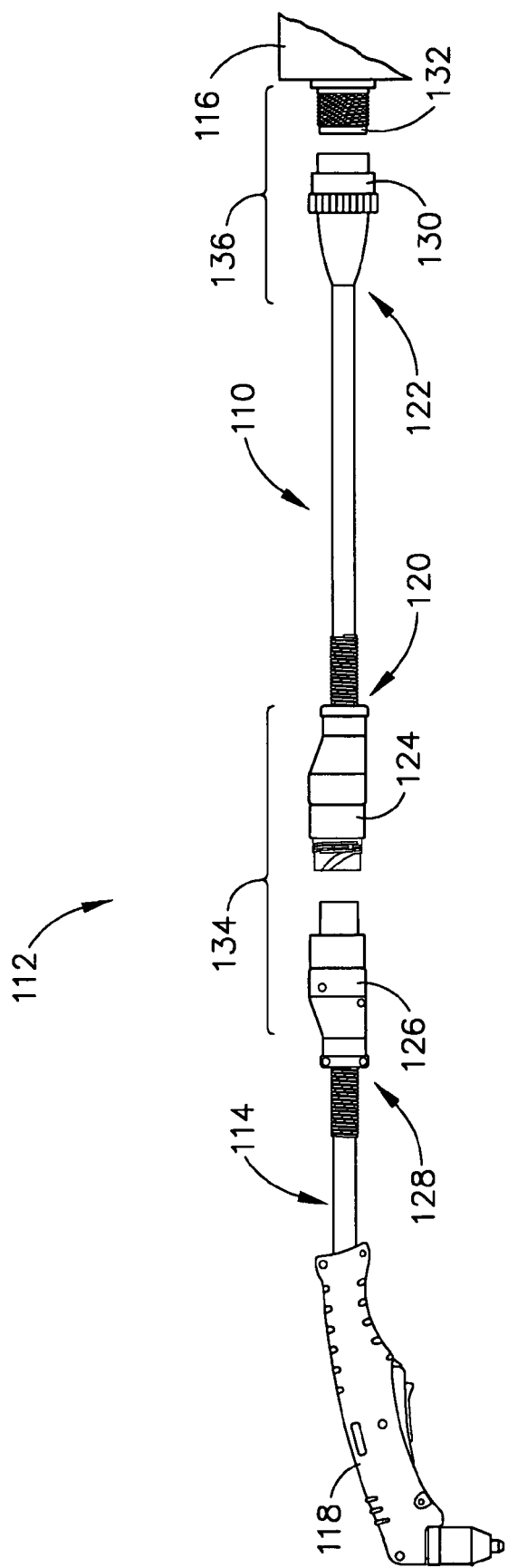
FIG. 7 is a side elevation view of a plasma arc torch including a torch lead adapter constructed in accordance with the principles of the present invention.

An alternative embodiment of the present invention provides a torch lead adapter, which is generally indicated by reference numeral 110 in FIG. 7. Similar to the first embodiment 10, as previously described, the torch lead adapter 110 is generally operable with a plasma arc torch 112 that comprises a torch lead 114, a power supply 116, and a torch 118. In the alternative embodiment 110, however, the torch lead 114 cannot be connected directly to the power supply 116 because the torch lead connector member 126 is not directly mateable with the power supply connector member 132. Thus, the torch lead adapter 110 may be used between the torch lead 114 and the power supply 116 to connect the torch lead 114 to the power supply 116, thereby providing for the supply of fluid and power and/or electrical control signals.

In the embodiment shown and described herein, the torch lead adapter 110 has a distal connector member 124 disposed at a distal end 120 of the torch lead adapter 110 that is engageable with the torch lead connector member 126 disposed at a proximal end 128 of the torch lead 114. The distal connector member 124 and the torch lead connector member 126 together comprise a distal quick disconnect 134, which allows the torch lead adapter 110 and the torch lead 114 to be quickly engaged with and disengaged from one another.

As shown, the distal connector member 124 may comprise a socket of the distal quick disconnect 134, and the torch lead connector member 126 may comprise a plug of the distal quick disconnect 134. Alternatively, as previously described, the distal connector member 124 may comprise the plug of the distal quick disconnect 134, and the torch lead connector member 126 may comprise the socket of the distal quick disconnect 134.

The torch lead adapter 110 further comprises a proximal connector member 130 disposed at a proximal end 122 of the torch lead adapter 110 that is engageable with the power supply connector member 132. By way of example only, the proximal connector member 130 is engageable with a connector member secured to a Powermax® power supply from Hypertherm®, Inc., Hanover, N.H. The proximal connector member 130 and the power supply connector member 132 together comprise a proximal quick disconnect 136, which allows the torch lead adapter 110 to be quickly engaged with and disengaged from the power supply 116.

Figure 8:
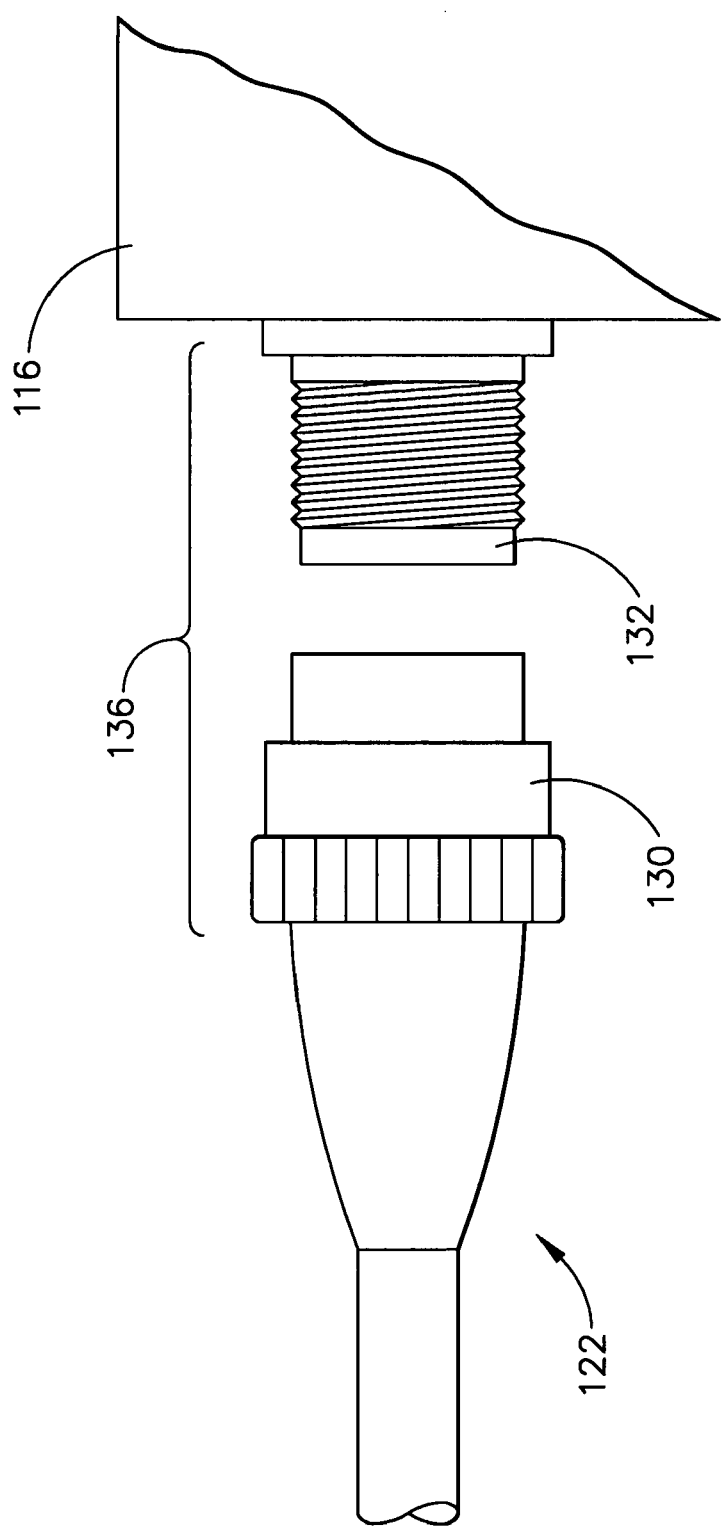
FIG. 8 is an enlarged side elevation view of a proximal connector member of a torch lead adapter and a power supply connector member aligned for engagement with one another in accordance with the principles of the present invention.

As shown in detail in FIG. 8, the proximal connector member 130 may comprise a plug of the proximal quick disconnect 136, and the power supply connector member 132 may comprise a socket of the proximal quick disconnect 136. The proximal quick disconnect 136 in one form as shown is a 20A-60A Single Gas Connector manufactured by Hypertherm®, Inc., Hanover, N.H. When used in conjunction with the torch lead adapter 110, the 20A-60A Single Gas Connector is advantageously improved because the torch lead adapter 110 allows the 20A-60A Single Gas Connector to be used with a variety of torch leads having different connector configurations including torch leads having non-Hypertherm connector configurations. Alternatively, the proximal connector member 130 may comprise the socket of the proximal quick disconnect 136, and the power supply connector member 132 may comprise the plug of the proximal quick disconnect 136.

Figure 9:
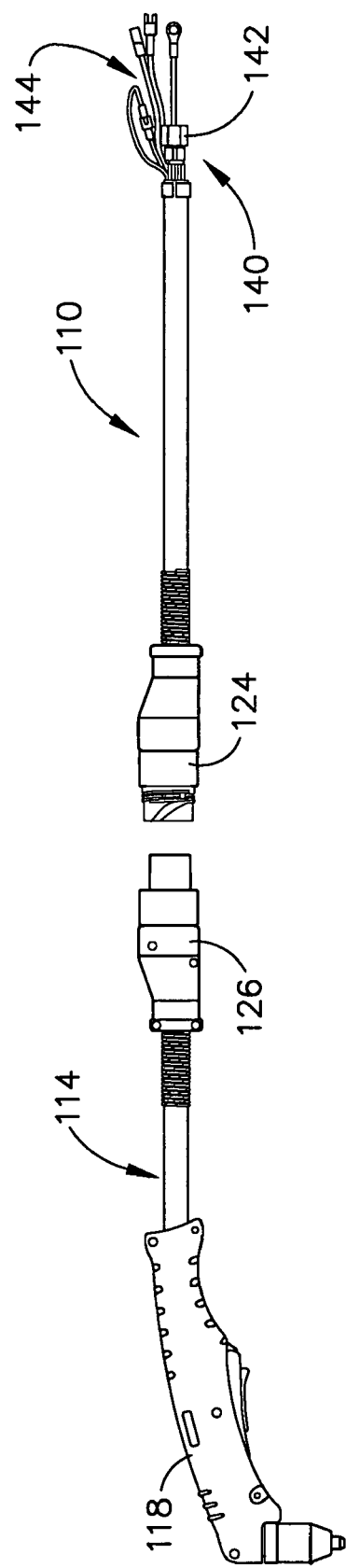
FIG. 9 is a side elevation view of a torch lead adapter constructed in accordance with the principles of the present invention.

Referring now to FIG. 9, the torch lead adapter 110 may comprise a proximal connector member 140 that defines a fitting 142 and a plurality of wires 144. The fitting 142 and wires 144 may be connected to either a torch lead extension as previously described, or to the power supply 116 (not shown) through another adapter having a mating fitting and a plurality of wires. Accordingly, either the distal connector member 124 or the proximal connector member 140 may define a socket or plug for a quick disconnect or a fitting and a plurality of wires for a connection to an adjacent plasma arc torch system component such as a torch lead 114, a torch lead extension 10, or a power supply 116.

Although the distal and proximal quick disconnects 134 and 136 may comprise any of a wide range of suitable quick disconnects that are capable of conducting both fluid and power and/or electrical control signals, the distal and proximal quick disconnects 134 and 136 are not of the same quick disconnect configuration in the alternative embodiment 110. That is, the torch lead connector member 126 is not directly engageable or mateable with the power supply connector member 132. The torch lead connector member 126 may not be directly mateable with the power supply connector member 132 for any number of reasons. For example, the torch lead connector member 126 and power supply connector member 132 may have different characteristics, such as different types, sizes, makes, or capacities, among others. Or for example, the torch lead connector member 126 and power supply connector member 132 may both be the same side of a quick disconnect. That is, the torch lead connector member 126 and power supply connector member 132 may both be plugs or they may both be sockets as previously described. Accordingly, because the torch lead connector member 126 and power supply connector member 132 are not directly mateable with one another, the distal connector member 124 is not directly engageable or mateable with the proximal connector member 130.

By way of example only, the distal or proximal quick disconnect 134 or 136 may comprise the connector disclosed in copending application titled "Plasma Arc Torch Quick Disconnect", U.S. patent application Ser. No. 10/052,364, filed Nov. 9, 2001, which is commonly assigned with the present application, and the contents of which are incorporated herein by reference. As another example, the distal or proximal quick disconnect 134 or 136 may comprise the connector described in U.S. Pat. No. 5,074,802 of Gratziani, et al. entitled "Pneumatic-Electric Quick Disconnect Connector for a Plasma Arc Torch." Alternatively, the distal and proximal quick disconnects 134 and 136 may comprise any of a wide range of quick disconnects capable of conducting both fluid and power and/or electrical control signals that are now know in the art or that may be developed in the future.

As with the torch lead extension 10, the length of the torch lead adapter 110 is fixed such that when a different length is required for a certain operation, a different torch lead adapter having a longer or shorter length is connected between the torch lead 114 and the power supply 116. Accordingly, different length torch lead adapters 110 may be used or employed depending on the requirements of a specific operation. That is, the torch lead adapter 110 may comprise any suitable length without departing from the spirit and scope of the present invention. Consequently, the torch lead adapter 110 not only allows the torch lead 114 to be connected to the power supply 116, but the torch lead adapter 110 also increases the distance at which the torch 118 may be operated away from the power supply 116.

Figure 6:
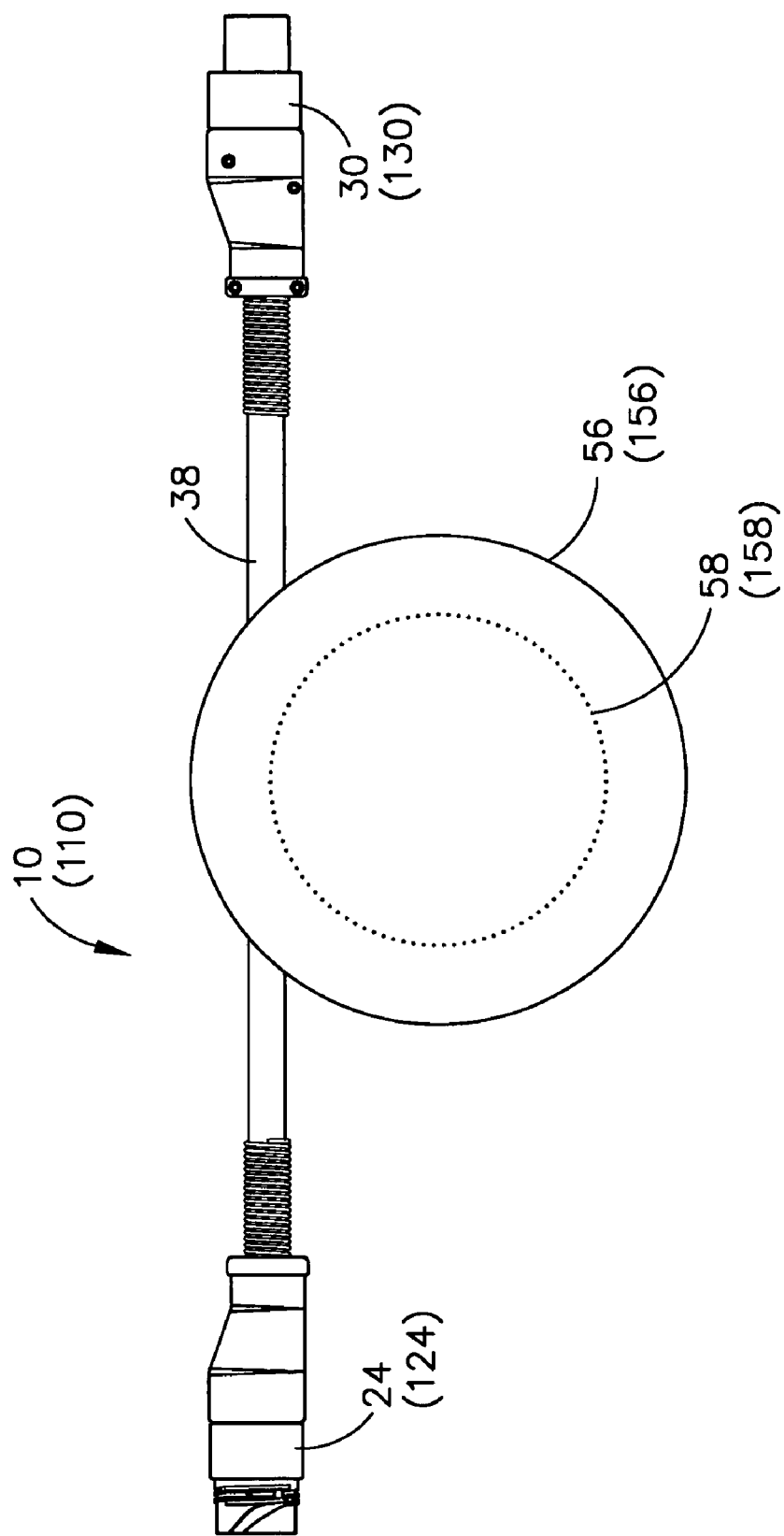
FIG. 6 is a side elevation view of a second embodiment of a torch lead extension having a variable operational length in accordance with the principles of the present invention.

Additionally, the operational or functional length of a single torch lead adapter 110 may be variable or adjustable. As illustrated in FIG. 6, the torch lead adapter 110 is sufficiently flexible to be at least partially wrapped or wound around a spool-like member 156, such as a spool or reel, among others. Preferably, the spool-like member 156 is a cylindrical shape that defines a curved surface 158. The curved surface 158 is sized to receive at least a portion of the torch lead adapter 110, or to allow at least a portion of the torch lead adapter 110 to be wrapped at least partially around the curved surface 158. Preferably, the curved surface 158 has a radius of curvature that is greater than the minimum bend radius of the torch lead adapter 110 to ensure that the torch lead adapter 110 will not be damaged or otherwise degraded when wrapped around the curved surface 158 of the spool-like member 156.

As a result, the distance between the distal and proximal connector members 124 and 130 of the torch lead adapter 110 may be either increased by unwrapping at least a portion of the torch lead adapter 110 from the curved surface 158 of the spool-like member 156, or decreased by wrapping at least a portion of the torch lead adapter 110 around the curved surface 158 of the spool-like member 156. If the operation required, the torch lead adapter 110 may be completely unrolled from the curved surface 158 of the spool-like member 156.

The process of wrapping the torch lead adapter 110 around the curved surface 158 of the spool-like member 156 may be manual, automated, or a combination thereof. Likewise, the process of unwrapping the torch lead adapter 110 from the curved surface 158 of the spool-like member 156 may also be either manual, automated, or a combination thereof. However, because devices for spooling and retracting are well-known in the art, the spool-like member 156 and the processes for spooling the torch lead adapter 110 around the curved surface 158 and for retracting the torch lead adapter 110 from the curved surface 158 are not described in further detail herein. In any event, by providing an adjustable operational length, the present invention allows for improved handling of longer torch lead adapters.

The remaining components (e.g., outer sheath, inner sheath, fluid passage, electrical conductors, wires, etc.) of the torch lead adapter 110 may be substantially identical to the corresponding components of the torch lead extension 10, and thus are not described in further detail herein.

In yet another form, the present invention provides a method for connecting the torch lead 114 to the power supply 116. The method comprise the steps of: engaging the distal connector member 124 with the torch lead connector member 126; and engaging the proximal connector member 130 with the power supply connector member 132. Accordingly, the torch lead adapter 110 is quickly assembled between the torch lead 114 and the power supply 116, thereby allowing the torch 118 to receive fluid and power and/or electrical control signals between the power supply 116, the torch lead adapter 110, and the torch lead 114 even though the torch lead connector member 126 is not directly mateable with the power supply connector member 132.

The method for connecting the torch lead 114 to the power supply 116 may further comprise the step of wrapping at least a portion of the torch lead adapter 110 at least partially around the curved surface 158 defined by the spool-like member 156, thereby decreasing the distance between the distal and proximal connector members 124 and 130 of the torch lead adapter 110. Alternatively, the method may further comprise the step of unwrapping at least a portion of the torch lead adapter 110 from the curved surface 158 defined by the spool-like member 156, thereby increasing the distance between the distal and proximal connector members 124 and 130 of the torch lead adapter 110.

Figure 10:
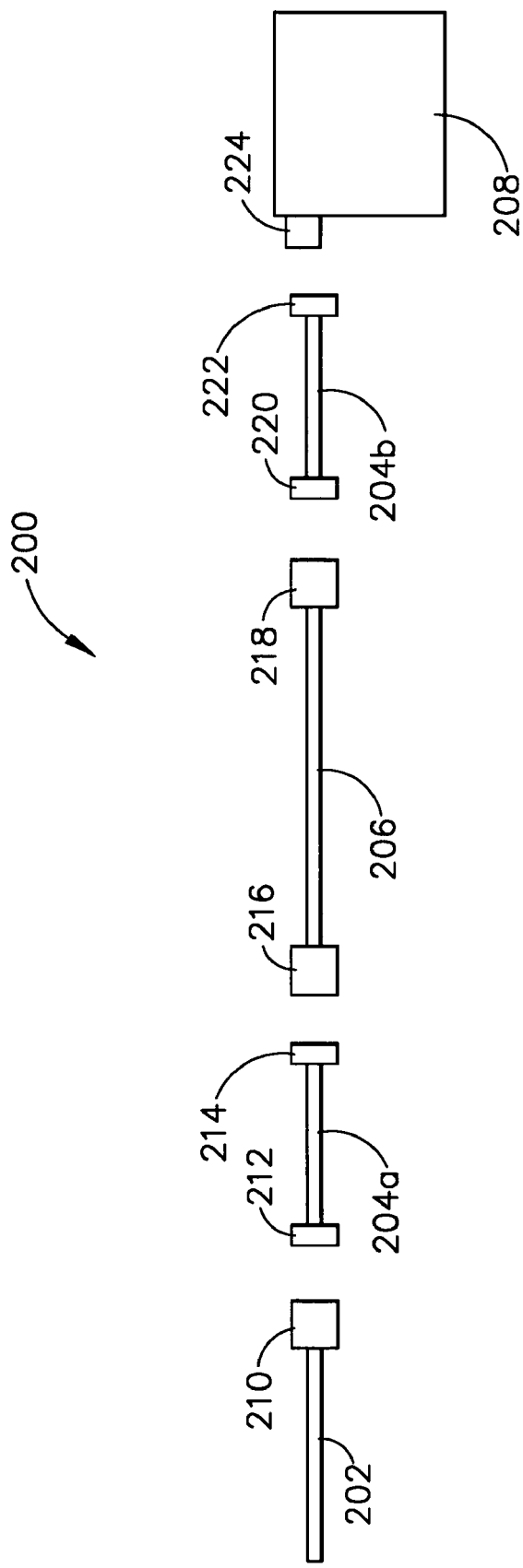
FIG. 10 is a side elevation view of a plasma arc torch system comprising at least one torch lead adapter and at least one torch lead extension in accordance with the principles of the present invention.

Referring now to FIG. 10, yet another embodiment of the present invention is illustrated, wherein a plasma arc torch system 200 is shown that comprises a torch lead 202, at least one torch adapter 204a, at least one torch extension 206, another torch adapter 204b, and a power supply 208. As shown, the torch lead 202 comprises a proximal connector member 210, the torch adapter 204a comprises a distal connector member 212 and a proximal connector member 214, the torch lead extension 206 comprises a distal connector member 216 and a proximal connector member 218, the torch adapter 204b comprises a distal connector member 220 and a proximal connector member 222, and the power supply 208 comprises a connector member 224. The connector members 210, 212, 214, 216, 218, 220, 222, and 224 may comprise either sockets or plugs for a quick disconnect as previously described or a fitting and a plurality of wires as previously described. Accordingly, all of the possible configurations for the connector members are not illustrated in FIG. 10 for purposes of clarity since the connector members have been previously described with various embodiments of the present invention.

The plasma arc torch system 200 accommodates a plasma arc torch wherein the torch lead 202 is not directly connectable to the torch lead extension 206, and where the torch lead extension 206 is not directly connectable to the power supply 208. The torch adapters 204a and 204b, and the torch extension 206 are constructed and operate as previously described, wherein adapter 204a is used to connect the torch lead 202 to the torch extension 206, and the adapter 206b is used to connect the torch extension 206 to the power supply 208 when the respective connector members of the torch lead 202, the torch extension 206, and the power supply are not directly mateable as previously described. Accordingly, fluid and power and/or electrical control signals flow between the power supply 208, the torch adapters 204a and 204b, the torch extension 206, and the torch lead 202. Further, either one or a plurality of torch adapters 204 may be employed, and a plurality of torch extensions 206 may also be employed as previously described while remaining within the scope of the present invention.

Figure 11:
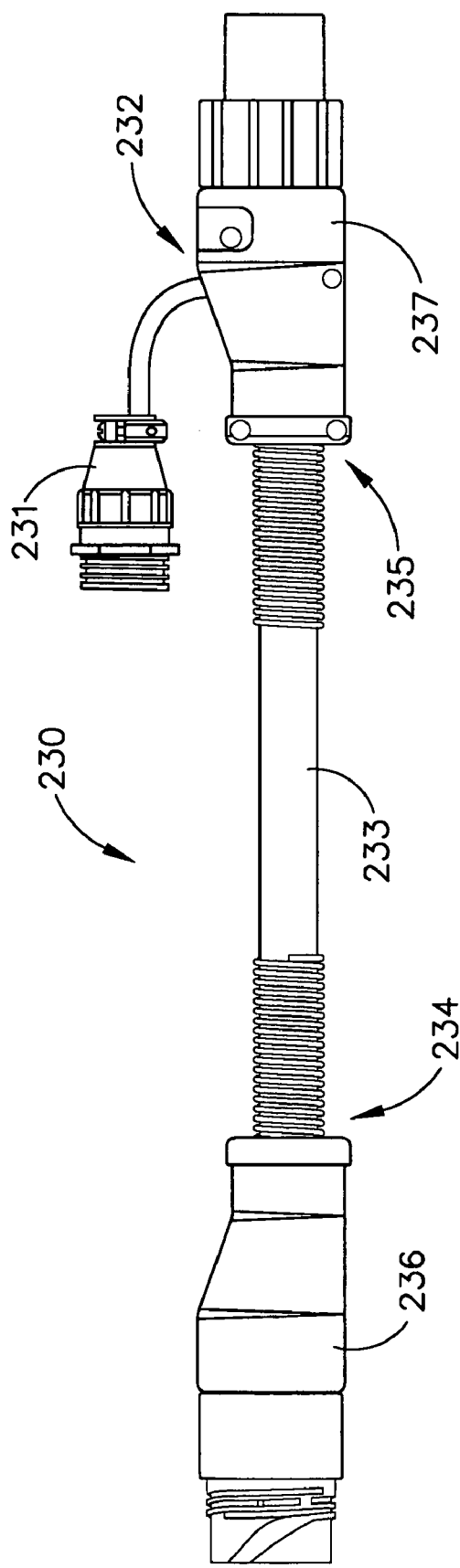
FIG. 11 is a side elevation view of a lead insert constructed in accordance with the teachings of the present invention.
Figure 12:
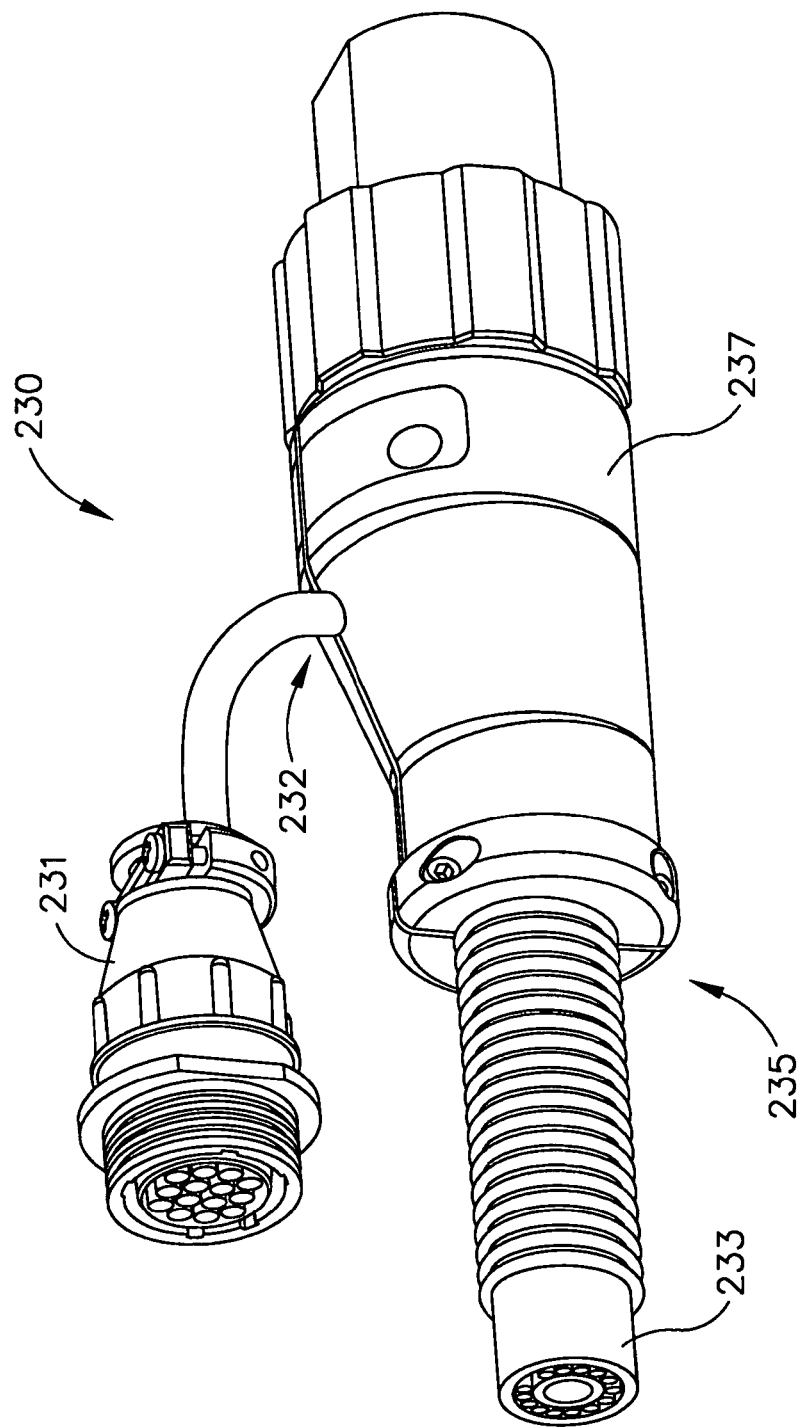
FIG. 12 is an enlarged perspective view of the lead insert constructed in accordance with the teachings of the present invention.

As shown in FIGS. 11 and 12, yet another embodiment of the present invention is shown, wherein a lead insert 230 is employed to provide for installation and removal of a signal port 232. Signals include, by way of example, start/stop signals sent to the power supply, on/off signals sent to solenoids (not shown) located at the distal end of the torch lead, and auxiliary gas or water flow to the torch, among others. As shown, an exemplary electrical connector 231 is spliced into the lead insert 230 through the signal port 232, however, other types of connectors or controls may also be employed while remaining within the scope of the present invention.

The lead insert 230 further comprises a conduit 233 for conducting fluid and power and/or electrical control signals defining a proximal end 234 and a distal end 235. A proximal connector member 236 is disposed at the proximal end 234, and a distal connector member 237 disposed at the distal end 235. As shown, the distal connector member 237 is a plug that is configured for engagement with a connector member of another plasma arc torch system component such as a torch lead or a power supply as previously described. Alternately, a fitting with a plurality of wires as previously described may also be employed as a distal connector member 237.

Similarly, the proximal connector member 236 is configured for engagement with a connector member of another plasma arc torch system component such as a torch lead extension as previously described. As shown, the proximal connector member 236 defines a socket configuration while the adjoining connector member would define a plug configuration, thereby defining a quick disconnect as previously described that connects the lead insert 230 to the torch lead extension. Alternately, a fitting with a plurality of wires as previously described may also be employed as a proximal connector member 236.

As further shown, the signal port 232 is spliced into the lead insert 230, preferably proximate the distal connector member 237. The signal port 232 may alternately be spliced proximate the proximal connector member 236 or along the length of the conduit 233 as required. As a result, the lead insert 230 provides a quick and efficient device for integrating additional signals into a plasma arc torch system.

Accordingly, the torch lead extension 10 of the present invention increases the distance at which a plasma arc torch may be operated away from a power supply. Additionally, the torch lead adapter 110 of the present invention allows a power supply to be quickly and easily adapted for use with a variety of torch leads having different connector configurations. By allowing one plasma arc torch to be easily interchanged with various power supplies, the present invention allows for the reduction of plasma arc torch inventories and the costs associated therewith because a single power supply can be used with a variety of plasma arc torches. Moreover, the lead insert 30 allows additional signals to be easily integrated into a plasma arc torch system according to the teachings of the present invention.

The description of the invention is merely exemplary in nature and, thus, variations that do not depart from the substance of the invention are intended to be within the scope of the invention. Such variations are not to be regarded as a departure from the spirit and scope of the invention.

What is claimed is:

1. A plasma arc torch lead extension for connecting the proximal end of a torch lead to a power supply, comprising:
   at least one conduit for conducting fluid and electrical power, the conduit having a proximal end and a distal end;
   at least one distal connector member disposed at the distal end of the conduit, and being engageable with the proximal end of the torch lead;
   at least one proximal connector member disposed at the proximal end of the conduit, and being engageable with the power supply; and
   a spool-like member disposed between the distal connector member and the proximal connector member and defining a curved surface sized to receive at least a portion of the conduit, wherein the distance between the proximal and distal connector members may be decreased by wrapping at least a portion of the conduit at least partially around the curved surface, and wherein the distance between the proximal and distal connector members may be increased by unwrapping at least a portion of the conduit from the curved surface, and
   wherein fluid and electrical power are conducted between the power supply, the torch lead extension, and the torch lead when the proximal connector member is engaged with the power supply and the distal connector member is engaged with the proximal end of the torch lead.

2. The plasma arc torch lead extension according to claim 1, wherein the distal connector member is engageable with a torch lead connector member disposed at the proximal end of the torch lead, and wherein the distal connector member and the torch lead connector member comprise a quick disconnect.

3. The plasma arc torch lead extension according to claim 1, wherein the proximal connector member is engageable with a power supply connector member of the power supply, and wherein the proximal connector member and the power supply connector member comprise a quick disconnect.

4. The plasma arc torch lead extension according to claim 1, wherein the distal connector member comprises at least one socket for receiving at least a portion of a torch lead connector member disposed at the proximal end of the torch lead.

5. The plasma arc torch lead extension according to claim 1, wherein the distal connector member comprises at least one plug for engaging at least a portion of a torch lead connector member disposed at the proximal end of the torch lead.

6. The plasma arc torch lead extension according to claim 1, wherein the proximal connector member comprises at least one plug for engaging at least a portion of a power supply connector member of the power supply.

7. The plasma arc torch lead extension according to claim 1, wherein the proximal connector member comprises at least one socket for engaging at least a portion of a power supply connector member of the power supply.

8. The plasma arc torch lead extension according to claim 1, wherein the distal connector member comprises a fitting and a plurality of wires for engaging at least a portion of a torch lead connector member disposed at the proximal end of the torch lead.

9. The plasma arc torch lead extension according to claim 1, wherein the proximal connector member comprises a fitting and a plurality of wires for engaging at least a portion of a power supply connector member of the power supply.

10. The plasma arc torch lead extension according to claim 1 further comprising a wire wrapped around the conduit proximate the distal connector member to provide a strain relief.

11. The plasma arc torch lead extension according to claim 1 further comprising a wire wrapped around the conduit proximate the proximal connector member to provide a strain relief.

12. The plasma arc torch lead extension according to claim 1, wherein the proximal connector member is engageable with a Hypertherm® Powermax® power supply.

13. The plasma arc torch lead extension according to claim 1, wherein the distal connector member is engageable with a Thermal Dynamics® plasma arc torch lead.

14. A plasma arc torch lead extension for connecting one plasma arc torch system component to another plasma arc torch system component comprising:
   at least one conduit for conducting fluid and electrical power, the conduit having a proximal end and a distal end;
   at least one distal connector member disposed at the distal end of the conduit and being engageable with one plasma arc torch system component;
   at least one proximal connector member disposed at the proximal end of the conduit and being engageable with the other plasma arc torch system component; and
   a spool-like member disposed between the distal connector member and the proximal connector member and defining a curved surface sized to receive at least a portion of the conduit, wherein the distance between the proximal and distal connector members may be decreased by wrapping at least a portion of the conduit at least partially around the curved surface, and wherein the distance between the proximal and distal connector members may be increased by unwrapping at least a portion of the conduit from the curved surface, and
   wherein fluid and electrical power are conducted from one plasma arc torch system component, through the torch lead extension, and to the other plasma arc torch system component when the proximal connector member is engaged with one plasma arc torch system component and the distal connector member is engaged with the other plasma arc torch system component.

15. The plasma arc torch lead extension according to claim 14, wherein the distal connector member is engageable with a connector member of one plasma arc torch system component, and wherein the distal connector member and the connector member comprise a quick disconnect.

16. The plasma arc torch lead extension according to claim 14, wherein the proximal connector member is engageable with a connector member of one plasma arc torch system component, and wherein the proximal connector member and the connector member comprise a quick disconnect.

17. The plasma arc torch lead extension according to claim 14, wherein the distal connector member comprises a fitting and a plurality of wires.

18. The plasma arc torch lead extension according to claim 14, wherein the proximal connector member comprises a fitting and a plurality of wires.

19. A plasma arc torch lead, comprising:
    at least one conduit for conducting fluid and electrical power, the conduit having a proximal end and a distal end;
    at least one proximal connector member disposed at the proximal end of the conduit; and
    a spool-like member disposed between the proximal and distal ends of the conduit, the spool-like member defining a curved surface, and the curved surface being sized to receive at least a portion of the conduit,
    wherein a distance between the proximal and distal ends may be decreased by wrapping at least a portion of the conduit at least partially around the curved surface, and
    wherein a distance between the proximal and distal ends may be increased by unwrapping at least a portion of the conduit from the curved surface.

20. The plasma arc torch lead according to claim 19, wherein the proximal connector member is engageable with a connector member of one plasma arc torch system component, and wherein the proximal connector member and the connector member comprise a quick disconnect.

21. The plasma arc torch lead according to claim 19, wherein the proximal connector member comprises at least one socket.

22. The plasma arc torch lead according to claim 19, wherein the proximal connector member comprises at least one plug.

23. The plasma arc torch lead according to claim 19, wherein the proximal connector member comprises a fitting and a plurality of wires.

24. The plasma arc torch lead according to claim 19 further comprising a wire wrapped around the conduit proximate the proximal connector member to provide a strain relief.

25. A plasma arc torch lead, comprising:
    a conduit for conducting fluid and electrical power, the conduit having a proximal end and a distal end;
    a proximal connector member disposed at the proximal end of the conduit; and
    a device for winding at least a portion of the conduit to change the distance between the proximal and distal ends.

26. The plasma arc torch lead according to claim 25, wherein the proximal connector member is engageable with a connector member of one plasma arc torch system component, and wherein the proximal connector member and the connector member comprise a quick disconnect.

27. The plasma arc torch lead according to claim 25, wherein the proximal connector member comprises a fitting and a plurality of wires.

28. A plasma arc torch lead adapter for connecting one plasma arc torch system component to another plasma arc torch system component:
    at least one conduit for conducting fluid and electrical power, the conduit having a proximal end and a distal end;
    at least one distal connector member disposed at the distal end of the conduit and being engageable with one plasma arc torch system component; and
    at least one proximal connector member disposed at the proximal end of the conduit and being engageable from one plasma arc torch system component, through the torch lead adapter, and to the other plasma arc torch system component when the proximal connector member is engaged with one plasma arc torch system component and the distal connector member is engaged with the other plasma arc torch system component.

29. The plasma arc torch lead adapter according to claim 28, wherein the distal connector member is engageable with a connector member of one plasma arc torch system component, and wherein the distal connector member and the connector member comprise a quick disconnect.

30. The plasma arc torch lead adapter according to claim 28, wherein the proximal connector member is engageable with a connector member of one plasma arc torch system component, and wherein the proximal connector member and the connector member comprise a quick disconnect.

31. The plasma arc torch lead adapter according to claim 28, wherein the distal connector member comprises a fitting and a plurality of wires.

32. The plasma arc torch lead adapter according to claim 28, wherein the proximal connector member comprises a fitting and a plurality of wires.

33. The plasma arc torch lead adapter according to claim 28 further comprising a wire wrapped around the conduit proximate the distal connector member to provide a strain relief.

34. The plasma arc torch lead adapter according to claim 28 further comprising a wire wrapped around the conduit proximate the proximal connector member to provide a strain relief.

35. A plasma arc torch lead adapter for connecting a distal end of a torch lead extension to a proximal end of a torch lead comprising:
    at least one conduit for conducting fluid and electrical power, the conduit having a proximal end and a distal end;
    at least one distal connector member disposed at the distal end of the conduit and being engageable with the proximal end of the torch lead; and
    at least one proximal connector member disposed at the proximal end of the conduit and being engageable with the distal end of the torch lead extension,
    wherein fluid and electrical power may be conducted through the torch lead extension, through the torch lead adapter, and to the torch lead when the proximal connector member is engaged with the distal end of the torch lead extension and the distal connector member is engaged with the proximal end of the torch lead.

36. The plasma arc torch lead adapter according to claim 35, wherein the distal connector member is engageable with a connector member of torch lead, and wherein the distal connector member and the connector member comprise a quick disconnect.

37. The plasma arc torch lead adapter according to claim 35, wherein the proximal connector member is engageable with a connector member of the torch lead extension, and wherein the proximal connector member and the connector member comprise a quick disconnect.

38. The plasma arc torch lead adapter according to claim 35, wherein the distal connector member comprises a fitting and a plurality of wires.

39. The plasma arc torch lead adapter according to claim 35, wherein the proximal connector member comprises a fitting and a plurality of wires.

40. The plasma arc torch lead adapter according to claim 35, further comprising a spool-like member defining a curved surface sized to receive at least a portion of the conduit, wherein the distance between the proximal and distal connector members may be decreased by wrapping at least a portion of the conduit at least partially around the curved surface, and wherein the distance between the proximal and distal connector members may be increased by unwrapping at least a portion of the conduit from the curved surface.

41. The plasma arc torch lead adapter according to claim 35, further comprising a device for winding at least a portion of the conduit to change the distance between the proximal and distal connector members.

42. A plasma arc torch lead adapter for connecting a proximal end of a torch lead extension to a power supply comprising:
   at least one conduit for conducting fluid and electrical power, the conduit having a proximal end and a distal end;
   at least one distal connector member disposed at the distal end of the conduit and being engageable with the proximal end of the torch lead extension; and
   at least one proximal connector member disposed at the proximal end of the conduit and being engageable with the power supply,
   wherein fluid and electrical power may be conducted between the power supply, the torch lead adapter, and the torch lead extension when the proximal connector member is engaged with the distal end of the torch lead extension and the distal connector member is engaged with the power supply.

43. The plasma arc torch lead adapter according to claim 42, wherein the distal connector member is engageable with a connector member of the torch lead extension, and wherein the distal connector member and the connector member comprise a quick disconnect.

44. The plasma arc torch lead adapter according to claim 42, wherein the proximal connector member is engageable with a connector member of the power supply, and wherein the proximal connector member and the connector member comprise a quick disconnect.

45. The plasma arc torch lead adapter according to claim 42, wherein the distal connector member comprises a fitting and a plurality of wires.

46. The plasma arc torch lead adapter according to claim 42, wherein the proximal connector member comprises a fitting and a plurality of wires.

47. The plasma arc torch lead adapter according to claim 42, wherein the proximal connector member is engageable with a Hypertherm® Powermax® power supply.

48. A plasma arc torch lead adapter for connecting a proximal end of a torch lead to a power supply comprising:
   at least one conduit for conducting fluid and electrical power, the conduit having a proximal end and a distal end;
   at least one distal connector member disposed at the distal end of the conduit and being engageable with the proximal end of the torch lead; and
   at least one proximal connector member disposed at the proximal end of the conduit and being engageable with the power supply,
   wherein fluid and electrical power may be conducted between the power supply, the torch lead adapter, and the torch lead when the proximal connector member is engaged with the distal end of the torch lead and the distal connector member is engaged with the power supply.

49. The plasma arc torch lead adapter according to claim 48, wherein the distal connector member is engageable with a connector member of the torch lead, and wherein the distal connector member and the connector member comprise a quick disconnect.

50. The plasma arc torch lead adapter according to claim 48, wherein the proximal connector member is engageable with a connector member of the power supply, and wherein the proximal connector member and the connector member comprise a quick disconnect.

51. The plasma arc torch lead adapter according to claim 48, wherein the distal connector member comprises at least one socket.

52. The plasma arc torch lead adapter according to claim 48, wherein the distal connector member comprises at least one plug.

53. The plasma arc torch lead adapter according to claim 48, wherein the proximal connector member comprises at least one socket.

54. The plasma arc torch lead adapter according to claim 48, wherein the proximal connector member comprises at least one plug.

55. The plasma arc torch lead adapter according to claim 48, wherein the distal connector member comprises a fitting and a plurality of wires.

56. The plasma arc torch lead adapter according to claim 48, wherein the proximal connector member comprises a fitting and a plurality of wires.

57. The plasma arc torch lead adapter according to claim 48, further comprising a spool-like member defining a curved surface sized to receive at least a portion of the conduit, wherein the distance between the proximal and distal connector members may be decreased by wrapping at least a portion of the conduit at least partially around the curved surface, and wherein the distance between the proximal and distal connector members may be increased by unwrapping at least a portion of the conduit from the curved surface.

58. The plasma arc torch lead adapter according to claim 48, further comprising a device for winding at least a portion of the conduit to change the distance between the proximal and distal connector members.

59. The plasma arc torch lead adapter according to claim 48, wherein the proximal connector member is engageable with a Hypertherm® Powermax® power supply.

60. A plasma arc torch system, comprising:
   a torch lead defining a proximal end;
   a power supply; and
   a torch lead extension comprising:
      at least one conduit for conducting fluid and electrical power, the conduit having a proximal end and a distal end;
      at least one distal connector member disposed at the distal end of the conduit and being engageable with the proximal end of the torch lead; and at least one proximal connector member disposed at the proximal end of the conduit and being engageable with the power supply.

61. A plasma arc torch system, comprising:
a torch lead defining a proximal end;
a power supply;
a torch lead extension comprising:
  at least one conduit for conducting fluid and electrical power, the conduit having a proximal end and a distal end;
  at least one distal connector member disposed at the distal end of the conduit; and
  at least one proximal connector member disposed at the proximal end of the conduit and being engageable with the power supply; and
a plasma arc torch lead adapter comprising:
  at least one conduit for conducting fluid and electrical power, the conduit having a proximal end and a distal end;
  at least one distal connector member disposed at the distal end of the conduit and being engageable with the proximal end of the torch lead; and
  at least one proximal connector member disposed at the proximal end of the conduit and being engageable with the distal connector member of the torch lead extension.

62. A plasma arc torch system, comprising:
a torch lead defining a proximal end;
a power supply;
a torch lead extension comprising:
  at least one conduit for conducting fluid and electrical power, the conduit having a proximal end and a distal end;
  at least one distal connector member disposed at the distal end of the conduit and being engageable with the proximal end of the torch lead; and
  at least one proximal connector member disposed at the proximal end of the conduit; and
a plasma arc torch lead adapter comprising:
  at least one conduit for conducting fluid and electrical power, the conduit having a proximal end and a distal end;
  at least one distal connector member disposed at the distal end of the conduit and being engageable with the proximal connector member of the torch lead extension; and
  at least one proximal connector member disposed at the proximal end of the conduit and being engageable with the power supply.

63. A plasma arc torch system, comprising:
a torch lead defining a proximal end;
a power supply;
a torch lead extension comprising:
  at least one conduit for conducting fluid and electrical power, the conduit having a proximal end and a distal end;
  at least one distal connector member disposed at the distal end of the conduit; and
  at least one proximal connector member disposed at the proximal end of the conduit;
a first plasma arc torch lead adapter comprising:
  at least one conduit for conducting fluid and electrical power, the conduit having a proximal end and a distal end;
  at least one distal connector member disposed at the distal end of the conduit and being engageable with the proximal connector member of the torch lead extension; and
  at least one proximal connector member disposed at the proximal end of the conduit and being engageable with the power supply; and
a second plasma arc torch lead adapter comprising:
  at least one conduit for conducting fluid and electrical power, the conduit having a proximal end and a distal end;
  at least one distal connector member disposed at the distal end of the conduit and being engageable with the proximal end of the torch lead; and
  at least one proximal connector member disposed at the proximal end of the conduit and being engageable with the distal connector member of the torch lead extension.

64. A plasma arc torch system, comprising:
a torch lead defining a proximal end;
a power supply; and
a plurality of torch lead extensions comprising:
  at least one conduit for conducting fluid and electrical power, the conduit having a proximal end and a distal end;
  at least one distal connector member disposed at the distal end of the conduit; and
  at least one proximal connector member disposed at the proximal end of the conduit,
wherein the distal connector member is engageable with an adjacent proximal connector member of a torch lead extension and the proximal end of the torch lead, and the proximal connector member is engageable with an adjacent distal connector member of another torch lead extension and the power supply.

65. An apparatus for connecting the proximal end of a plasma arc torch lead to a power supply, comprising:
means for conducting fluid and electrical power;
means for engaging the proximal end of the torch lead with the means for conducting fluid and electrical power; and
means for engaging the power supply with the means for conducting fluid and electrical power,
wherein the means for conducting fluid and electrical power provides for an adjustable length between the power supply and the torch lead.

66. An extended power supply system comprising:
a power supply comprising a power supply connector member;
a conduit for conducting fluid and electric power, the conduit having a proximal end and a distal end;
a proximal connector member disposed at the proximal end of the conduit and being engageable with the power supply connector member; and
a distal connector member disposed at the distal end of the conduit, the distal connector member defining a configuration substantially identical to the power supply connector member.

67. The extended power supply system according to claim 66, wherein the proximal connector member and the power supply connector member comprise a quick disconnect.

68. The extended power supply system according to claim 66, wherein the power supply comprises a Hypertherm® Powermax® power supply.

69. The extended power supply system according to claim 66, wherein the distal connector member is engageable with a Thermal Dynamics® plasma arc torch lead.

70. A lead insert for integrating signals into a plasma arc torch comprising:
- at least one conduit for conducting fluid and electrical power, the conduit having a proximal end and a distal end;
- at least one distal connector member disposed at the distal end of the conduit and being engageable with one plasma arc torch system component; and
- at least one proximal connector member disposed at the proximal end of the conduit and being engageable with another plasma arc torch system component; and
- a signal port spliced to the lead insert,
- wherein a plurality of signals may be integrated into the plasma arc torch through the signal port.

71. The lead insert according to claim 70, wherein the signal port is disposed proximate the distal connector member.

72. The lead insert according to claim 70, wherein the signal port is disposed proximate the proximal connector member.

73. The lead insert according to claim 70, wherein the signal port is disposed along the conduit.

74. A method for connecting the proximal end of a plasma arc torch lead to a power supply, the method comprising the steps of:
- engaging the power supply with a proximal connector member disposed at the proximal end of a conduit for conducting fluid and electrical power; and
- engaging the proximal end of the torch lead with a distal connector member disposed at the distal end of the conduit.

75. The method according to claim 74, further comprising the step of disengaging the proximal end of the torch lead from engagement with the power supply prior to engaging the proximal end of the torch lead with the distal connector member and prior to engaging the power supply with the proximal connector member.

76. The method according to claim 74, further comprising the step of changing the distance between the proximal and distal connector members.

77. The method according to claim 74, wherein the step of changing the distance between the proximal and distal connector members comprises:
- wrapping at least a portion of the conduit at least partially around a curved surface defined by a spool-like member; or, in the alternative,
- unwrapping at least a portion of the conduit from the curved surface defined by the spool-like member.

* * * * *